United States Patent
Zhang

(10) Patent No.: US 10,947,887 B2
(45) Date of Patent: Mar. 16, 2021

(54) METHOD AND SYSTEM FOR EXHAUST PARTICULATE MATTER SENSING

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 896 days.

(21) Appl. No.: 15/480,237

(22) Filed: Apr. 5, 2017

(65) Prior Publication Data

US 2018/0291792 A1  Oct. 11, 2018

(51) Int. Cl.
| | |
|---|---|
| *F01N 11/00* | (2006.01) |
| *G01N 15/06* | (2006.01) |
| *G01N 27/04* | (2006.01) |
| *F01N 13/00* | (2010.01) |
| *G01N 15/00* | (2006.01) |

(52) U.S. Cl.
CPC ............ *F01N 11/007* (2013.01); *F01N 11/00* (2013.01); *F01N 13/008* (2013.01); *G01N 15/0606* (2013.01); *G01N 15/0656* (2013.01); *G01N 27/04* (2013.01); *F01N 2560/05* (2013.01); *G01N 2015/0046* (2013.01); *Y02T 10/40* (2013.01)

(58) Field of Classification Search
CPC .... G01N 15/06; G01N 15/0606; G01N 27/02; G01N 27/028; G01N 27/04; F01N 11/00; F01N 11/007; F01N 13/008
See application file for complete search history.

(56) References Cited

U.S. PATENT DOCUMENTS

| | | | | |
|---|---|---|---|---|
| 6,839,620 | B1* | 1/2005 | Koehler | G01N 33/2888 701/108 |
| 2009/0078587 | A1* | 3/2009 | Farber | G01N 27/4065 205/781 |
| 2010/0000863 | A1* | 1/2010 | Kondo | G01N 15/0656 204/406 |
| 2010/0300068 | A1* | 12/2010 | Enomoto | F02D 41/1494 60/273 |
| 2011/0179769 | A1* | 7/2011 | Zhang | F01N 11/00 60/273 |

(Continued)

OTHER PUBLICATIONS

Zhang, Xiaogang, "Particulate Matter Sensor," U.S. Appl. No. 15/018,637, filed Feb. 8, 2016, 40 pages.

(Continued)

*Primary Examiner* — Huy Q Phan
*Assistant Examiner* — David B Frederiksen
(74) *Attorney, Agent, or Firm* — Geoffrey Brumbaugh; McCoy Russell LLP

(57) ABSTRACT

Methods and systems are provided for sensing particulate matter by a particulate matter (PM) sensor positioned upstream, or downstream, of a diesel particulate filter in an exhaust system. The PM sensor may include a curved sensor surface having interdigitated electrodes of differing voltages disposed thereon. An inlet may be disposed to capture a sample flow of exhaust from an exhaust flow from a diesel engine. A conduit may be formed to direct the sample flow toward the curved sensor surface in a direction that may form an acute angle with a line normal to the curved sensor surface.

18 Claims, 11 Drawing Sheets

(56) References Cited

U.S. PATENT DOCUMENTS

| | | | |
|---|---|---|---|
| 2014/0223887 A1* | 8/2014 | Duault | G01N 15/0656 60/274 |
| 2015/0153249 A1 | 6/2015 | Goulette et al. | |
| 2015/0355066 A1 | 12/2015 | Zhang | |
| 2015/0355067 A1 | 12/2015 | Zhang et al. | |
| 2016/0216174 A1* | 7/2016 | Cloudt | F01N 3/0211 |
| 2016/0312681 A1* | 10/2016 | Kamp | F02D 41/1446 |
| 2017/0010201 A1* | 1/2017 | Yazawa | G01N 33/0073 |
| 2017/0058735 A1 | 3/2017 | Zhang | |
| 2017/0058746 A1 | 3/2017 | Zhang | |
| 2017/0058748 A1 | 3/2017 | Zhang | |
| 2017/0074148 A1 | 3/2017 | Zhang | |

OTHER PUBLICATIONS

Zhang, Xiaogang, "Urea Mixer," U.S. Appl. No. 15/042,680, filed Feb. 12, 2016, 35 pages.

Zhang, Xiaogang, "Method and System for Exhaust Particulate Matter Sensing," U.S. Appl. No. 15/062,384, filed Mar. 7, 2016, 57 pages.

Zhang, Xiaogang, "Method and System for Exhaust Particulate Matter Sensing." U.S. Appl. No. 15/145,117, filed May 3, 2016, 64 pages.

Zhang, Xiaogang, "System for Sensing Particulate Matter," U.S. Appl. No. 15/168,528, filed May 31, 2016, 48 pages.

Zhang, Xiaogang, "Method and System for Exhaust Particulate Matter Sensing," U.S. Appl. No. 15/214,171, filed Jul. 19, 2016, 72 pages.

Zhang, Xiaogang, "Method and System for Exhaust Particulate Matter Sensing," U.S. Appl. No. 15/289,741, filed Oct. 10, 2016, 50 pages.

Zhang, Xiaogang, "Method and System for Exhaust Particulate Matter Sensing," U.S. Appl. No. 15/290,893, filed Oct. 11, 2016, 51 pages.

\* cited by examiner

METHOD AND SYSTEM FOR EXHAUST PARTICULATE MATTER SENSING

FIELD

The present description relates generally to the design and use of resistive-type particle matter (PM) sensors in an exhaust gas flow.

BACKGROUND/SUMMARY

Diesel combustion may generate emissions, including particulate matter (PM). The particulate matter may include diesel soot and aerosols such as ash particulates, metallic abrasion particles, sulfates, and silicates. When released into the atmosphere, PM can take the form of individual particles or chain aggregates, with most in the invisible sub-micrometer range of 100 nanometers. Various technologies have been developed for identifying and filtering out exhaust PMs before the exhaust is released to the atmosphere.

As an example, soot sensors, or PM sensor, may be used in vehicles having internal combustion engines. A PM sensor may be located upstream and/or downstream of a diesel particulate filter (DPF), and may be used to sense PM loading on the filter and diagnose operation of the DPF. The PM sensor may sense a particulate matter or soot load based on a correlation between a measured change in electrical conductivity (or resistivity) between a pair of thin electrodes placed on a planar substrate surface of the sensor with the amount of PM deposited between the measuring electrodes. Specifically, the measured conductivity provides a measure of soot accumulation.

An example PM sensor is shown by Goulette et. al. in US 2015/0153249 A1. Therein, a conductive material disposed on a substrate is patterned to form interdigitated "comb" electrodes of a PM sensor. When a voltage is applied across the electrodes, soot particles are accumulated at or near the surface of the substrate between the electrodes.

The inventors herein have recognized potential issues with such systems. As an example, in such PM sensors, only a small fraction of the PM in the incoming exhaust experiences the electrostatic forces exerted between the electrodes and gets collected across the electrodes formed on the surface of the sensor, thereby leading to low sensitivity of the sensors. Further, even the fraction of the PM that is accumulated on the surface may not be uniform due to a bias in flow distribution across the surface of the sensor. The PM may tend to accumulate mostly, or strictly, at the inlet side of the sensor, and achieve low, and/or non-uniform soot loading. The non-uniform deposition of the PM on the sensor surface may further exacerbate the issue of low sensitivity of the sensor.

The inventors have recognized the above issues and have identified an approach to at least partly address the issues. In one example, the issues above may be addressed by a particulate matter sensor, including: a curved sensor surface having interdigitated electrodes of differing voltages disposed thereon. An inlet may be disposed to capture a sample flow of exhaust from an exhaust flow from a diesel engine. A conduit may be formed to direct the sample flow toward the curved sensor surface in a direction that may form an acute angle with a line normal to the curved sensor surface. In this way, effective measurement of a PM concentration may be sensed. Also in this way, soot capture may be better distributed and more uniform, and the sensitivity and reliability of the sensor may be improved.

Overall, these characteristics of the sensor assembly may cause an output of the sensor assembly to be more accurate, thereby increasing the accuracy of estimating particulate loading on a particulate filter.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
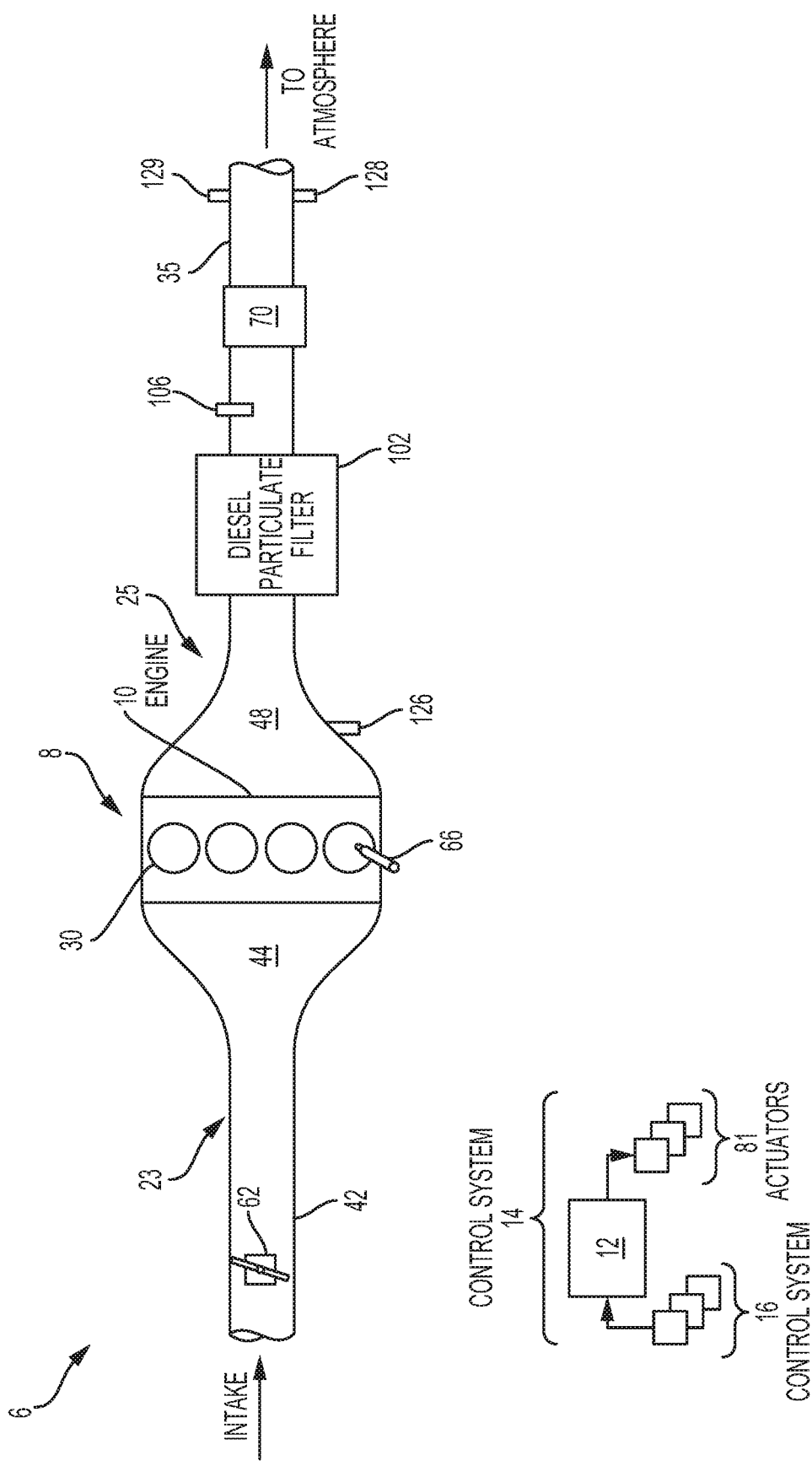
FIG. 1 shows a schematic diagram of an engine and an associated particulate matter (PM) sensor positioned in an exhaust flow.

The following description relates to embodiments of a particulate matter sensor (PM sensor) including systems and methods for sensing particulate matter (PM) in an exhaust flow of an engine system, such as the engine system shown in FIG. 1. Embodiments may include a controller 12 that may be configured to perform one or more control routines, to aid, or accomplish various engine operations which may include one or more routines to accumulate exhaust PM across electrodes formed in accordance with the present disclosure. Effective and well distributed accumulation of the PM by the embodiments disclosed herein may cause an output of the PM sensor to be more accurate, thereby increasing the accuracy of estimating particulate loading on a particulate filter, and bolstering the monitoring effectiveness of the PM filter upstream from the PM sensor. In addition, by enabling more accurate diagnosis of the particulate filter, exhaust emissions compliance may be improved. As such, this may reduce warranty costs associated with replacing functional particulate filters. In addition, exhaust emissions may be improved and exhaust component life may be extended.

FIG. 1 shows a schematic depiction of a vehicle system 6. The vehicle system 6 includes an engine system 8. The engine system 8 may include an engine 10 having a plurality of cylinders 30. Engine 10 includes an engine intake 23 and an engine exhaust 25. Engine intake 23 may include a throttle 62 fluidly coupled to the engine intake manifold 44 via an intake passage 42. The engine exhaust 25 includes an exhaust manifold 48 eventually leading to an exhaust passage 35 that routes exhaust gas to the atmosphere. Throttle 62 may be located in intake passage 42 downstream of a boosting device, such as a turbocharger (not shown), and upstream of an after-cooler (not shown). When included, the after-cooler may be configured to reduce the temperature of intake air compressed by the boosting device.

Engine exhaust 25 may include one or more emission control devices 70, which may be mounted in a close-coupled position in the exhaust. One or more emission control devices may include a three-way catalyst, lean NOx filter, SCR catalyst, etc. Engine exhaust 25 may also include a diesel particulate filter (DPF) 102, which temporarily filters PMs from entering gases, positioned upstream of emission control device 70. In one large example, as depicted, DPF 102 is a diesel particulate matter retaining system. DPF 102 may have a monolith structure made of, for example, cordierite or silicon carbide, with a plurality of channels inside for filtering particulate matter from diesel exhaust gas. Tailpipe exhaust gas that has been filtered of PMs, following passage through DPF 102, may be measured in, or with, a Particulate Matter (PM) sensor 106 and may be further processed in emission control device 70 and expelled to the atmosphere via exhaust passage 35. In the depicted example, PM sensor 106 may be a resistive sensor that may be configured to estimate the filtering efficiency of the DPF 102 based on a change in conductivity measured across the electrodes of the PM sensor 106.

The vehicle system 6 may further include a control system 14. Control system 14 is shown receiving information from a plurality of sensors 16 and sending control signals to a plurality of actuators 81. As one example, sensors 16 may include exhaust flow rate sensor 126 configured to measure a flow rate of exhaust gas through the exhaust passage 35, exhaust gas sensor (located in exhaust manifold 48), temperature sensor 128, pressure sensor 129 (located downstream of emission control device 70), and PM sensor 106. Other sensors such as additional pressure, temperature, air/fuel ratio, exhaust flow rate and composition sensors may be coupled to various locations in the vehicle system 6. As another example, the actuators 81 may include fuel injectors 66, throttle 62, DPF valves that control filter regeneration (not shown), a motor actuator controlling PM sensor opening (e.g., controller opening of a valve or plate in an inlet of the PM sensor 106), etc.

The many example actuators 81 may include one or more switches coupled to PM measurement circuitry. The control system 14 may include a controller 12. The controller 12 may be configured with computer readable instructions stored on non-transitory memory. The controller 12 may receive signals from the various sensors 16, may process the signals, and may employ various actuators 81 to adjust engine operation based on the received signals and instructions stored on a memory of the controller 12. As an example, while operating the PM sensor 106 to accumulate soot particulates, the controller 12 may send one or more control signals to an electric circuit to apply a voltage to electrodes of a sensor element of 202 a PM sensor assembly 107 to trap the charged particulates onto the surface of sensor electrodes 202 of the PM sensor 106, or sensor element.

As another example, during PM sensor 106 regeneration, the controller 12 may send a control signal to a regeneration circuit 198, such as a heating element, to close a switch in the regeneration circuit 198 for a threshold time to apply a voltage to the regeneration circuit 198, coupled to electrodes to heat the electrodes of the PM sensor 106. In this way, the electrodes may be heated to burn off soot particles deposited on the surface of the electrodes 202.

Embodiments may include one or more curvilinear sensor surfaces 200 disposed and shaped such that exhaust gas samples, i.e. a sample flow 210, may impact the surface 200 at an acute angle 216, and may make additional impacts, and/or contact, with the sensor surface 200. In this way, soot which may be present in the exhaust gas sample may tend to make effective contact with the sensor surface which may, for example, be trapped electrostatically as discussed, onto the curvilinear sensor surface(s) 200, and PM concentration levels may be effectively measured. Also, in this way, the impacting gas may effect a rolling, or slipping, motion across the sensor surface 200 which may tend to move the sampled gas further along the sensor surface 200 wherein the continuing curve of the sensor surface 200 may effectively position more sensor electrodes 202 in the path of the flowing exhaust. The flowing exhaust may in turn impact, or re-impact the curving sensor surface 200 at an acute angle further downstream. The second, or additional, acute angle may or may not be different from the first acute angle. In this way, an overall, somewhat continuous, effect of sample exhaust flow making effective impact along a considerable length of sensor surface 200 may be accomplished.

Figure 5:
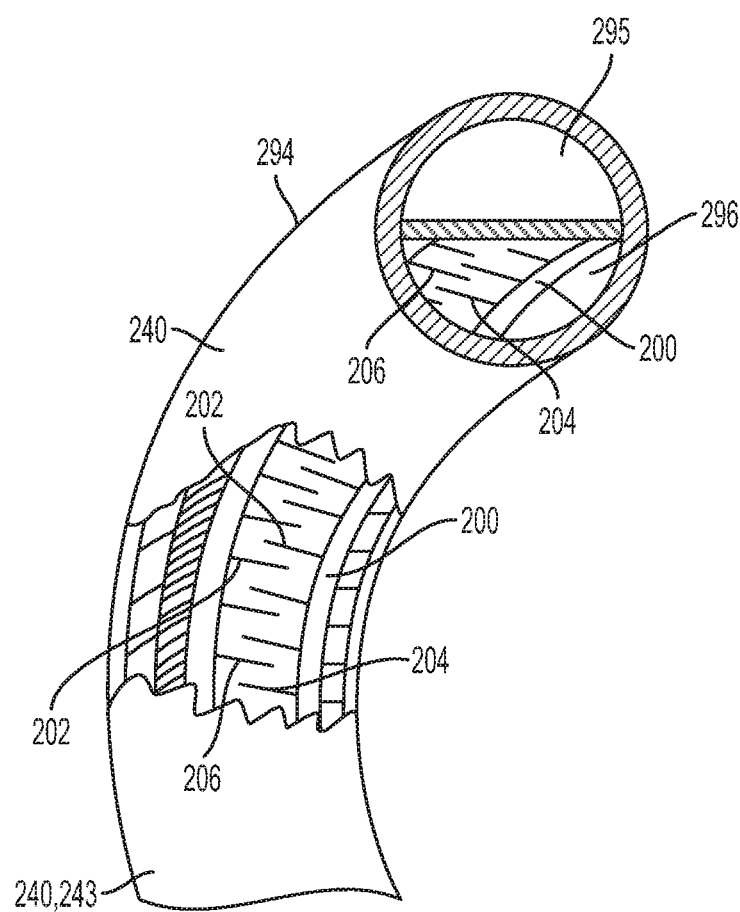
FIG. 5 is a partial cutaway perspective view of a conduit with a sensor surface disposed therein in accordance with the disclosure.
Figure 6:
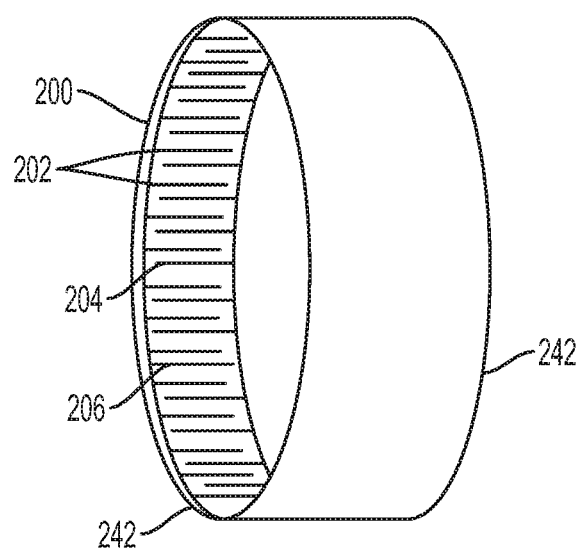
FIG. 6 is a perspective view of a cylindrical sensor surface having interdigitated comb-like electrodes disposed thereon, and having a cylindrical shape in accordance with the disclosure.
Figure 7:
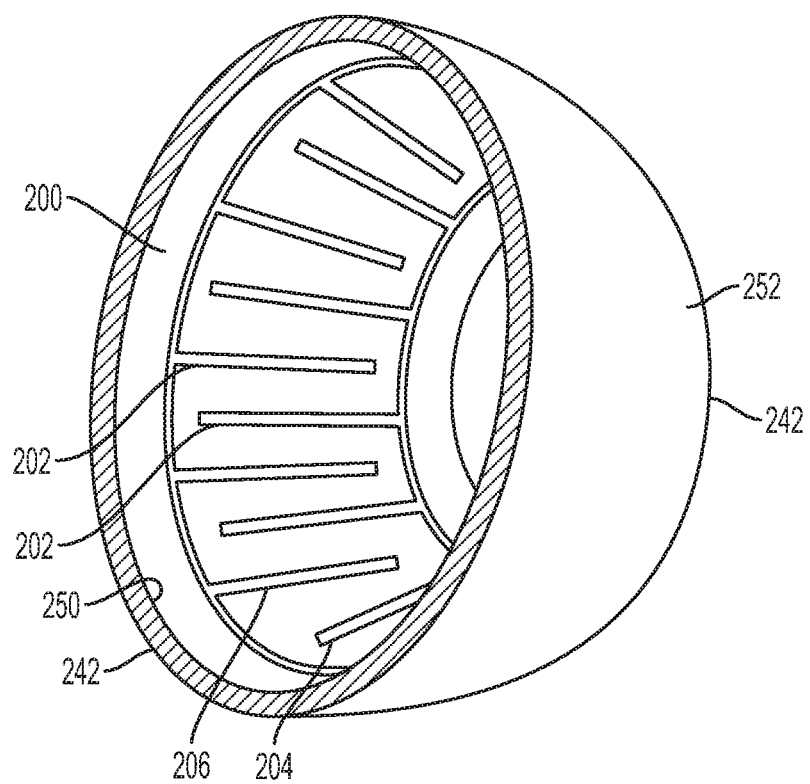
FIG. 7 is a perspective view of a curvilinear sensor surface shaped as a frustocone, or a conical section, in accordance with the disclosure.
Figure 8:
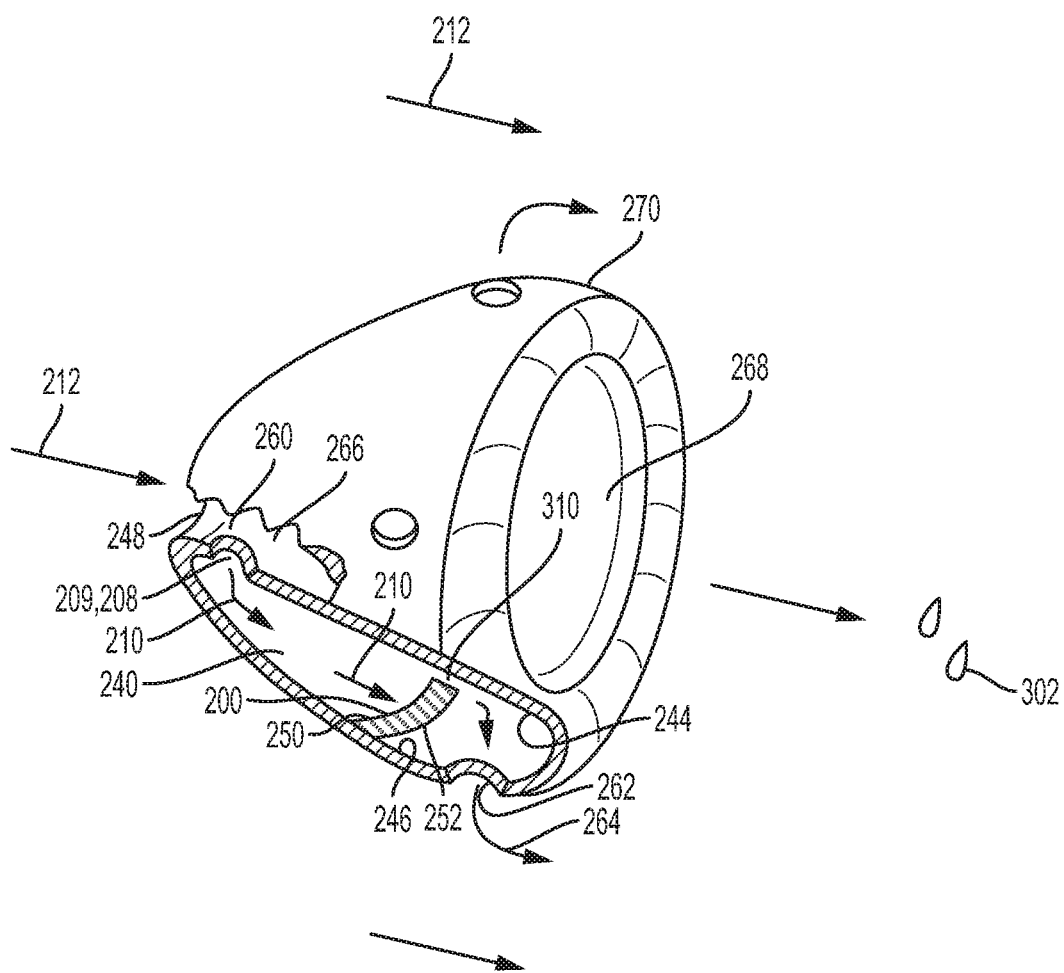
FIG. 8 is a perspective view of an example sensor in accordance with the disclosure.
Figure 9:
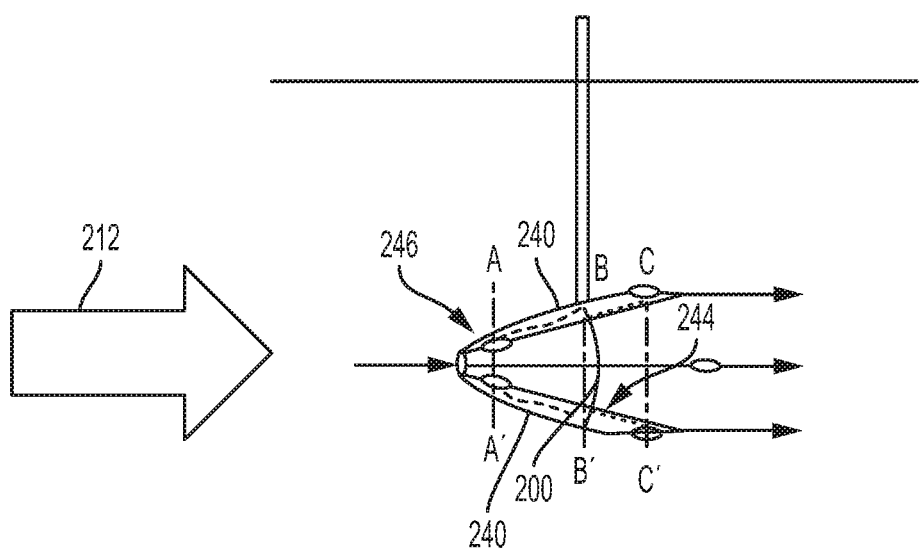
FIG. 9 is a cross-sectional view cut through an example conduit that may be considered similar to the conduit shown in FIG. 8 in accordance with the disclosure.
Figure 9A:
FIGS. 9A, 9B and 9C are respective cross-sectional views taken respectively at lines A-A, B-B, and C-C in FIG. 9.
Figure 9B:
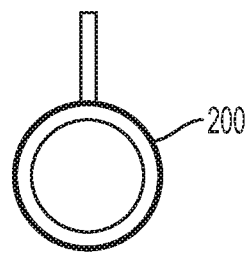
Figure 9C:
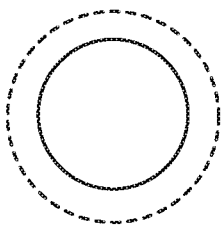

The sensor surface 200 may be curved, or, shaped, in various ways in accordance with this disclosure. Some examples are disclosed herein. FIG. 5 is a partial cutaway perspective view of a conduit 240 with a sensor surface 200 disposed therein. The sensor surface 200 may be a curvilinear surface shaped, for example, as a cylinder, or having a cylindrical surface. FIG. 6 is a perspective view of a cylindrical sensor surface having interdigitated comb-like electrodes 204, 206 disposed thereon. As illustrated, opposite ends of the curvilinear sensor surface may define circles 242, or ovals of similar, or equal, size or diameter. FIG. 7 illustrates a curvilinear sensor surface which may be shaped as a frustocone, or a conical section. In this case, as illustrated, opposite ends of the curvilinear sensor surface may define circles, or ovals of differing size, or diameter. FIG. 8 illustrates an example wherein a frustoconical sensor surface 200 may be disposed within a conduit 240 defined between an inner shield 244 and an outer shield 246. FIG. 9 is a cross-sectional view cut through a conduit 240, or conduit body configured the same or similar to the conduit 240 shown in FIG. 8.

Embodiments may provide a particulate matter sensor 106, or a soot sensor 106 that may include a curved sensor surface 200 that may have interdigitated electrodes 202 disposed thereon. The interdigitated electrodes 202 may be of, held to, or chargeable to, differing voltages. For example, a first set of comb-like electrodes 204 may be charged to a relatively positive voltage; and interposed, or interdigitated with the first set 204, may be a second set of comb-like electrodes 206. The second set 206 may be charged to a relatively negative voltage. Respective pairs of comb-like tines may provide a number of oppositely chargeable elements to sense the presence of particulate matter. For example, the presence of soot that may contact the gap between the first electrode 204 and the second electrode 206 may change measurable circuit characteristics.

Figure 10:
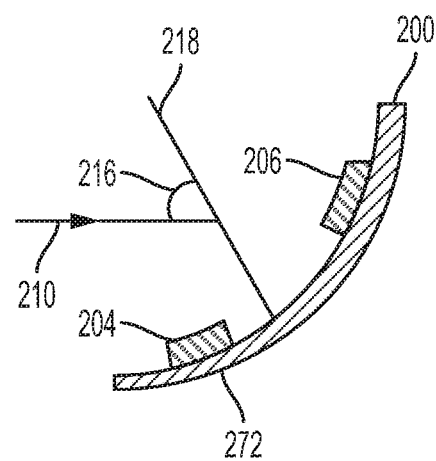
FIG. 10 is a detailed view of a curvilinear sensor surface in accordance with the disclosure.

Referring also, at least briefly, to FIG. 10, the soot sensor 106 may include an inlet 208 disposed to capture a sample flow 210 of exhaust from an exhaust flow 212 from a diesel engine 10, for example, the engine 10 illustrated in FIG. 1. A conduit 214 may be formed to direct the sample flow 210 toward the curved sensor surface 200 in a direction that forms an acute angle 216 with a line normal 218 to the curved sensor surface 200.

As discussed above, embodiments may provide sensor surfaces having an advantageous curvilinear shape. In some examples, the curved sensor surface 200 may be, for example, cylindrical. In other examples, the curved sensor surface 200 may be, for example, frusta-conical. Other shapes are possible.

Figure 2:
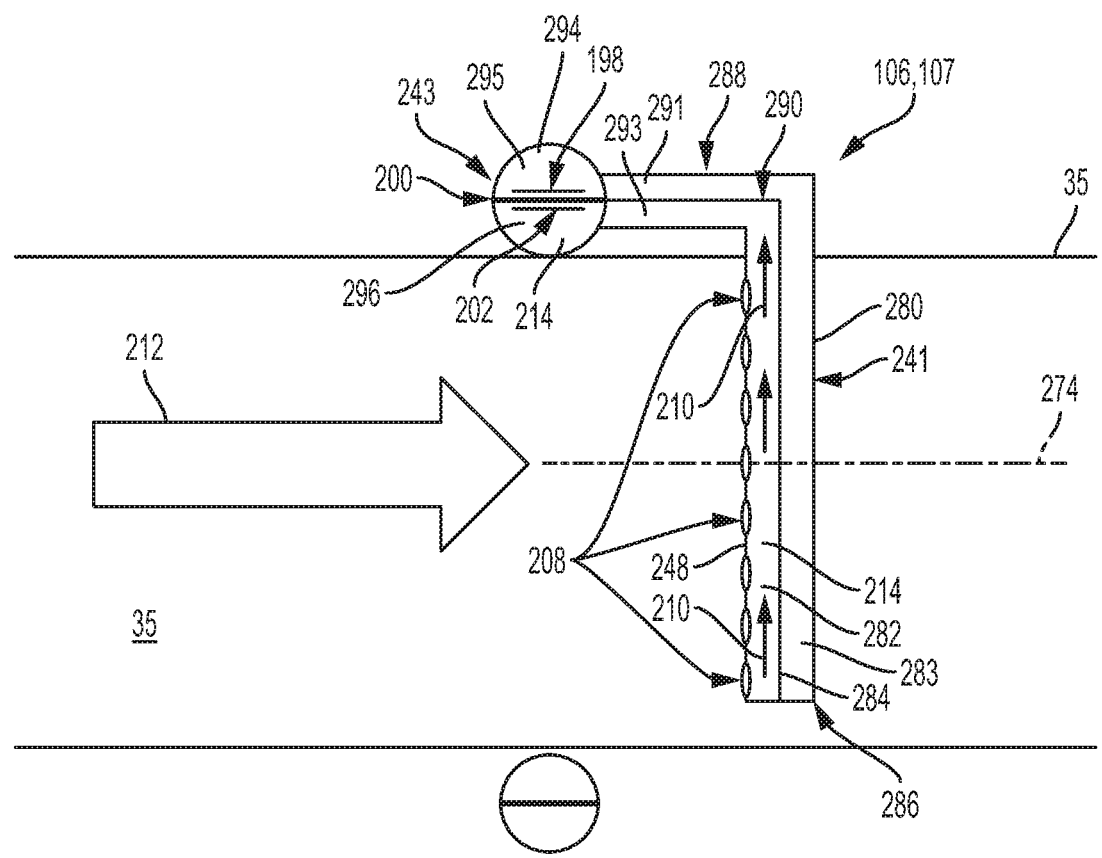
FIG. 2 is a side cross-sectional view of an example PM sensor, in accordance with the present disclosure.
Figure 3B:
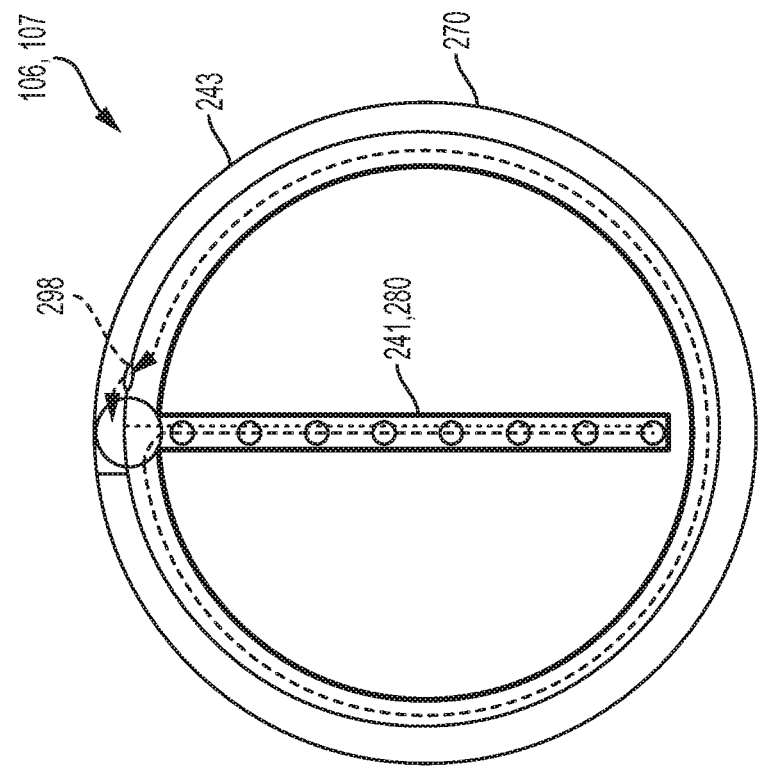
FIGS. 3A and 3B are respective side, and end, views illustrating a sample flow direction inside the example PM sensor shown in FIG. 2, in accordance with the present disclosure.
Figure 3A:
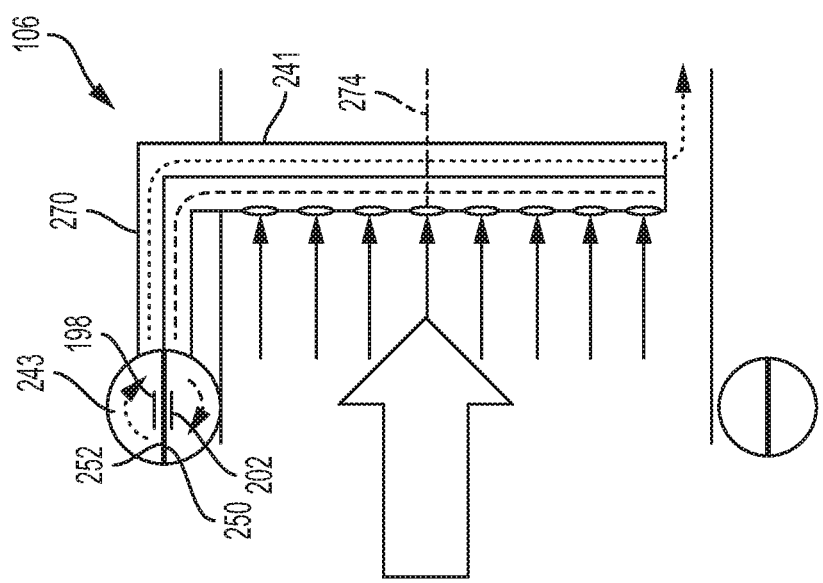
Figure 4:
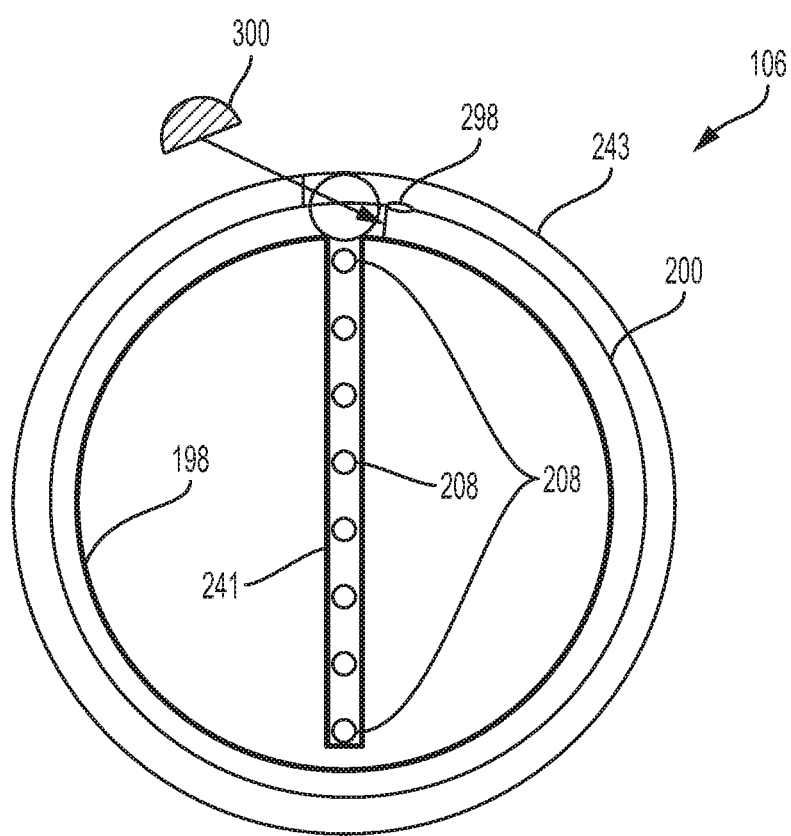
FIG. 4 is an end cross-sectional view of the example PM sensor shown in FIG. 2, with addition details illustrated, in accordance with the present disclosure.

Embodiments may provide a soot sensor, or particulate matter sensor 106, wherein the conduit 240 may include a first conduit 241 and a second conduit 243. Or, for example, a single conduit may be considered to comprise two or more conduit sections 241, 243. As illustrated in FIGS. 2-4 the first conduit 241 may be positioned transverse to the exhaust flow 212 may have two or more openings 208 at an upstream side 248 thereof to admit exhaust into the first conduit 241 at separate and differing radial locations in the exhaust flow 212, which may pass through an exhaust passage 35. The second conduit 243 may be toroid shaped, and may be fluidically coupled with the first conduit 241, and wherein the curved sensor surface 200 may be substantially cylindrical, and may be disposed inside the second conduit 243.

Referring in particular to FIGS. 2-4, the PM sensor arrangement, or PM sensor system 107 may include a vertical tube 280 which may be divided into two flow passages 282, 283 by a vertical bisection plate 284. The flow inlet holes 208 may be designed along the upstream surface 248 of the upstream half, i.e. upstream flow passage 282 of the vertical tube 280 facing the incoming exhaust flow 212. A flow exit hole 286 may be designed at the bottom of the downstream half of the vertical tube i.e. downstream flow passage 282.

A horizontal tube 288 with a horizontal bisection plate 290 to divide the tube into two flow passages: horizontal top passage 291, and horizontal bottom passage 293. The upstream half of the vertical tube 280 may be fluidly coupled to the bottom half of the horizontal tube 288, and the downstream half of the vertical tube 280 may be fluidly coupled to the top half of the horizontal tube 288. No exhaust gas exchange between two flow passages.

A circular tube 294 may be designed with an element base (for example the curvilinear sensor surface 200 discussed herein) as a bisector to divide the tube 294 into an outer flow passage 295 and an inner flow passage 296. The outer flow passage 295 may be fluidly coupled to the top half 292 of the horizontal tube 288 and the inner flow passage 296 may be fluidly coupled to the bottom half 293 of the horizontal tube 288.

A communication hole 298 (FIGS. 3B and 4) may be designed on the element base, i.e. curvilinear surface 200, to let exhaust gas flow from the inner half tube 296 to the outer half tube 295. A half discs 300 may be designed and installed to redirect the exhaust gas to flow along the inner half tube 296. FIGS. 3A and 3B show exhaust flow sample direction inside the system 107.

Embodiments may include interdigitated electrodes 202 on a concave side 250 of the curved sensor surface 200 and further comprising an electric circuit, which may be referred to as a regenerative circuit 198 on an opposite side 252 of the curved sensor surface 200 configured for sensor regeneration. The regenerative circuit 198 may heat the sensor surface 200 and may burn off particulate matter that may have accumulated. Regenerating may begin, and/or end a cycle of sensing the level of particulate matter. A detectable variance in repeated, and/or predetermined build up behavior as measured by the sensor 106 may signal a flaw, such as a leak, in the upstream filter.

In some cases, such as those illustrated in FIGS. 8-9, the conduit 240 may be defined between a conical inner shield 244 and an outer shield 246 wherein the inlet 208 is one or more holes 209 defined through the inner shield 244 at an upstream side 260, and further comprising one or more holes 262 defined through the outer shield 246 at a location of lower static pressure 264 than, the location 266 of, the one or more holes 209 in the inner shield 244.

The inner shield 244 may define a passage 268 through a sensor body 270 substantially in line with the exhaust flow 212, and wherein the one or more holes are opened to the passage 268 and angled in a downstream direction. Large water droplets 302 and diesel particulates may follow the exhaust flow and move directly through the passage due, for example to relatively greater momentum.

FIG. 10 is a detailed cross-sectional view of a curvilinear sensor 200 in accordance with the present disclosure. The curved sensor surface 200 may bend into the flow 210. The interdigitated electrodes 202 may be at differing positions relative to an upstream position of the flow, and/or at differing positions transverse to the sample flow. In this way, different pairs of the electrode tines 204, 206 may be impacted at differing times, and be at differing portions, of the flow 210.

Various embodiments may provide a method of determining a soot concentration level in a flow of exhaust. The method may include collecting two or more exhaust flow samples from respective two or more locations 208 within an exhaust flow downstream from a diesel particulate filter 102. The method may also include directing the flow samples toward a curvilinear sensor surface 200 such that the flow samples 210 impact the sensor surface 200 at an acute angle (FIG. 10) with a line tangent 272 with a curve of the curvilinear sensor surface 200. The method may also include positioning interdigitated electrodes transverse to an arc congruent with the curvilinear sensor surface 200.

Various embodiments may include positioning a first of respective pairs of oppositely charged interdigitated electrodes upstream and longitudinally offset from a second of the pair of oppositely charged interdigitated electrodes with regard to a general flow direction of the directed flow samples.

In some example embodiments, the collecting of the two or more exhaust flow samples includes inletting the samples into respective spaced apart openings along a first conduit oriented substantially orthogonal to a direction of the exhaust flow. The method may include positioning the curvilinear sensor surface inside a toroid shaped second conduit; and passing the samples from the first conduit through the second conduit.

In some example embodiments, the collecting the two or more exhaust flow samples may include inletting the samples through openings defined in a frusto-conical inner shield. The method may include passing the collected samples though a conduit defined between the inner shield and an outer shield and impacting the samples against the curvilinear sensor surface, and outletting the samples through openings defined through the outer shield. The method may include returning the sample flow to the exhaust flow minus some soot particles captured between the oppositely charged interdigitated electrodes.

Figure 11:
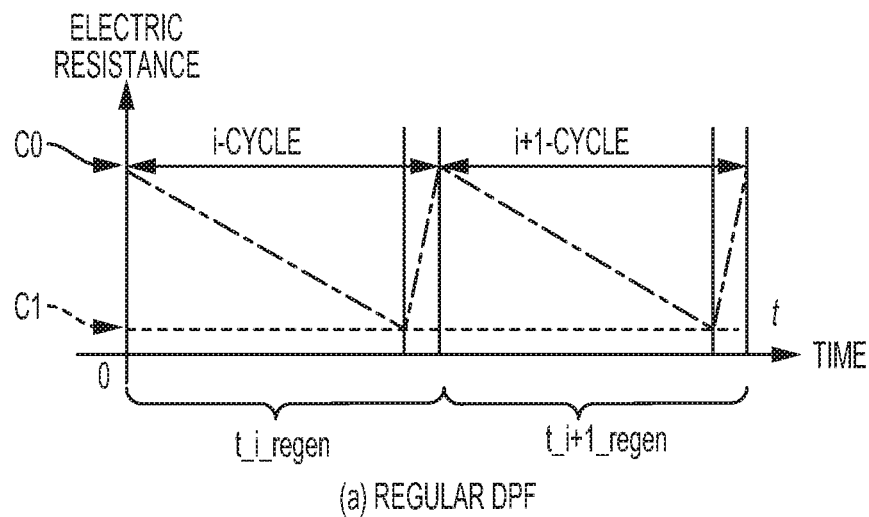
FIGS. 11 and 12 are graphical representations showing an example process of filter loading and regeneration in accordance with the present disclosure.
Figure 12:
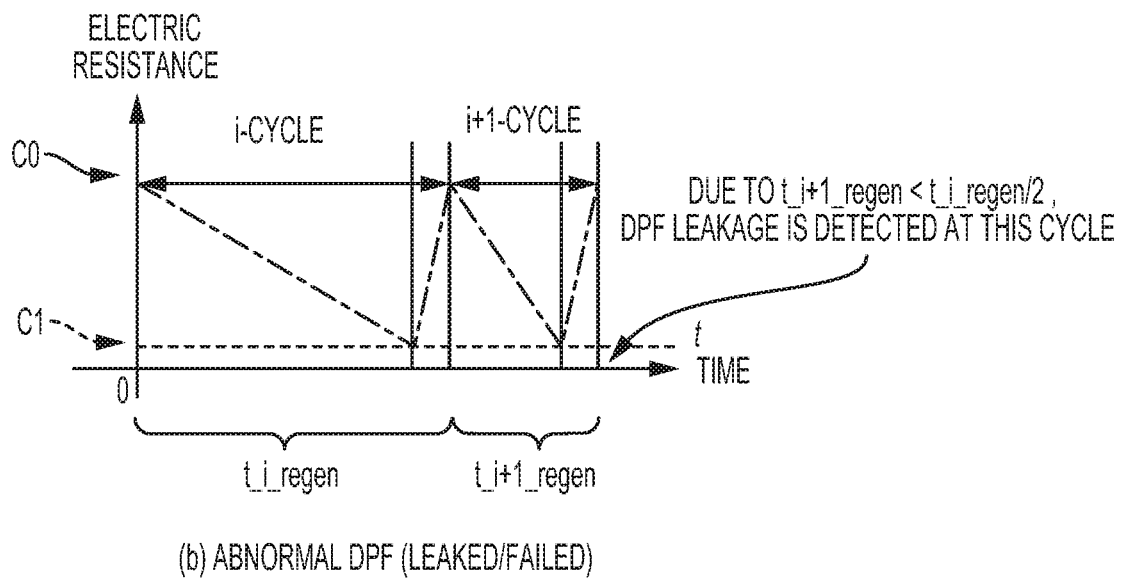

FIGS. 11 and 12 are graphical representations showing an example process of filter loading and regeneration in accordance with the present disclosure. C1 refers to a value that may be measured with the sensor at the start of a regeneration cycle; and C0 refers to a value that may be measured with the sensor at the end of a regeneration cycle. The process may repeat itself. A time interval may be recorded for each cycle and a comparison may be performed between previous time interval, $t\_i\_regen$, and current time interval, $t\_i+1\_regen$. If a DPF fails after ith sensor filter regeneration, soot concentration at downstream of DPF will be much higher, and calculated time interval between ith and (i+1)th regenerations will be much shorter. A DPF failure may then be identified if $t\_i+1\_regen < t\_i\_regen/2$.

Various embodiments may provide an exhaust gas sensor arrangement 107 that may include a conduit 240 to convey two or more exhaust gas samples 210 collected from an exhaust stream 212. A curved surface 200 may have electrically chargeable conductors 202 positioned thereon, and shaped and disposed within the conduit 240 such that a central line of flow of the two or more exhaust gas samples 210 may impact the curved surface 200 at an acute angle 216.

The conduit 240 may include two or more conduit sections 241, 243, and wherein one conduit section 243 may be toroidal shaped, and wherein the curved surface 200 may be substantially cylindrical and may be disposed within the toroidal shaped conduit section 243. The toroidal shaped conduit section 243 may be disposed outside an exhaust passage 35 and may be disposed substantially coaxial with a central axis of an exhaust passage which directs the exhaust stream 212 from a diesel engine 10.

The conduit 240 may include an inner boundary defined by a conical inner shield 244, and an outer boundary formed by a convex outer shield 246. The curved surface 200 may have the electrical conductors 202 may be substantially frusta-conical and may be disposed within the conduit 240. The curved surface of the outer boundary 246 may be a convex annular surface extending radially outward and tending to form one or more locations of low pressure 246 on an outside surface thereof. Embodiments may provide a gap 310 between the inner shield 244 and an inner radius of the curved surface 200 to allow the gas samples to pass, and to exit the conduit 240 downstream from the curved surface.

In some cases, the curved surface 200 may have an arc length of at least 30 degrees. In some cases the curved surface 200 may have an arc length of greater than 180 degrees, and may approach 360 degrees. In some cases, the acute angle 216 may be between 1 and 89 degrees. For example, the acute angle 216 may be greater than 5 degrees.

The technical effect of providing a PM sensor with a curved surface is that the sample flow may tend to impact the curved sensor surface having both a normal component of displacement toward the sensor surface and a longitudinal component along the sensor surface. This may tend to move the sampled gas further along the sensor surface, and may also tend to move more massive components suspended in the sample flow closer to the sensor surface. In this way, both effective contact and efficient use of the sensor surface area may be accomplished.

Note that the example control and estimation routines included herein can be used with various engine and/or vehicle system configurations. Selected actions of the control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

The figures show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A soot sensor comprising:
a curved sensor surface having interdigitated electrodes of differing voltages disposed thereon;
an inlet disposed to capture a sample flow of exhaust from an exhaust flow; and
a conduit formed to direct the sample flow toward the curved sensor surface in a direction that forms an acute angle with a line normal to the curved sensor surface, and wherein the conduit includes a first conduit and a second conduit, wherein:
the first conduit is positioned transverse to an exhaust flow having two or more openings at an upstream side thereof to admit exhaust into the first conduit at separate and differing radial locations in the exhaust flow, the second conduit is toroid shaped and fluidically coupled with the first conduit, and wherein the curved sensor surface is disposed inside the second conduit.

2. The soot sensor of claim 1, wherein the curved sensor surface is cylindrical.

3. The soot sensor of claim 1, wherein the curved sensor surface is frusta-conical.

4. The soot sensor of claim 1, wherein the interdigitated electrodes are on a concave side of the curved sensor surface and further comprising an electric circuit on an opposite side of the curved sensor surface configured for sensor regeneration.

5. The soot sensor of claim 1, wherein the conduit is defined between a conical inner shield and an outer shield wherein the inlet is one or more holes defined through the inner shield at an upstream side, and further comprising one or more holes defined through the outer shield at a location of lower static pressure than the one or more holes in the inner shield.

6. The soot sensor of claim 5, wherein the inner shield defines a passage through a sensor body substantially in line with the exhaust flow, and wherein the one or more holes are opened to the passage and angled in a downstream direction.

7. The soot sensor of claim 1, wherein the curved sensor surface bends into the flow, and wherein the interdigitated electrodes are at differing positions relative to an upstream position.

8. The soot sensor of claim 7, wherein the interdigitated electrodes are also at differing positions transverse to the sample flow.

9. A method of determining a soot concentration level in a flow of exhaust, comprising:
collecting two or more exhaust flow samples from respective two or more locations within an exhaust flow downstream from a diesel particulate filter; and
directing the flow samples toward a curvilinear sensor surface via a conduit such that the flow samples impact the sensor surface at an acute angle with a line tangent with a curve of the curvilinear sensor surface, wherein the conduit includes two conduit sections, and wherein a first conduit section is oriented substantially orthogonal to a direction of the exhaust flow, and a second conduit section is toroidal shaped, and the second conduit section is disposed outside an exhaust passage and is disposed substantially coaxial with a central axis of an exhaust passage which directs an exhaust stream from a diesel engine.

10. The method of claim 9, further comprising positioning interdigitated electrodes transverse to an arc congruent with the curvilinear sensor surface.

11. The method of claim 10, further comprising:
positioning a first of respective pairs of oppositely charged interdigitated electrodes upstream and longitudinally offset from a second of the pairs of oppositely charged interdigitated electrodes with regard to a general flow direction of the directed flow samples.

12. The method of claim 11, further comprising returning the sample flow to the exhaust flow minus some soot particles captured between the oppositely charged interdigitated electrodes.

13. The method of claim 9, wherein the collecting the two or more exhaust flow samples includes inletting the samples into respective spaced apart openings along the first conduit oriented substantially orthogonal to a direction of the exhaust flow.

14. The method of claim 13, further comprising:
positioning the curvilinear sensor surface inside the second conduit; and
passing the samples from the first conduit through the second conduit.

15. The method of claim 9, wherein the collecting the two or more exhaust flow samples includes inletting the samples through openings defined in a frusto-conical inner shield; and further comprising:
passing the collected samples though a conduit defined between the inner shield and an outer shield and impacting the samples against the curvilinear sensor surface; and
outletting the samples through openings defined through the outer shield.

16. An exhaust gas sensor arrangement, comprising:
a conduit to convey two or more exhaust gas samples collected from an exhaust stream, the conduit including two or more conduit sections, and wherein one conduit section is toroidal shaped, and the toroidal shaped conduit section is disposed outside an exhaust passage and is disposed substantially coaxial with a central axis of an exhaust passage which directs the exhaust stream from a diesel engine; and
a curved surface having electrically chargeable conductors positioned thereon, and shaped and disposed within the conduit such that a central line of flow of the two or more exhaust gas samples impacts the curved surface at an acute angle.

17. The exhaust gas sensor arrangement of claim 16, wherein the curved surface is substantially cylindrical and is disposed within the toroidal shaped conduit section.

18. The exhaust gas sensor arrangement of claim 16, wherein the conduit includes an inner boundary defined by a conical inner shield and an outer boundary formed by a convex outer shield, and wherein the curved surface having the electrical conductors is substantially frusta-conical and is disposed within the conduit, wherein the curved surface of the outer boundary is a convex annular surface extending radially outward and tending to form one or more locations of low pressure on an outside surface thereof, the arrangement further comprising a gap between the inner shield and an inner radius of the curved surface to allow the gas samples to pass and to exit the conduit downstream from the curved surface.

\* \* \* \* \*